United States Patent Office 3,157,713
Patented Nov. 17, 1964

3,157,713
METHOD OF MAKING RIGID MATERIALS FROM VINYL CHLORIDE POLYMER AND POLYMERIZABLE PLASTICIZER
Leonard Leese, Brantham, Suffolk, England, assignor to B.X. Plastics Limited, London, England
No Drawing. Filed June 26, 1961, Ser. No. 119,348
Claims priority, application Great Britain, June 30, 1960, 22,997
12 Claims. (Cl. 260—884)

This invention relates to the manufacture of shaped materials, for example, sheet material, based on polyvinyl chloride or a vinyl chloride copolymer.

It is known to make soft, flexible materials by mixing a polyvinyl chloride paste polymer and a non-polymerizable liquid, for example, dioctyl phthalate, and to effect gelation by heating at a temperature of 140° to 170° C. without the use of a polymerization initiator.

It has also been proposed to mix a plasticizable solid, for example, polyvinyl acetate, and a polymerizable plasticizer for such solid, for example, a vinyl or allyl ester of a polybasic acid, and to vulcanize the composition by polymerizing the plasticizer, for example, with the aid of a polymerization initiator such as, for instance, as benzoyl peroxide.

It has hitherto not been practicable, however, to obtain materials based on vinyl chloride polymers and copolymers, easily workable in the uncured-state and that are rigid or semi-rigid in the cured-state and at the same time have a good colour and clarity, when curing is effected by heating with or without the aid of an initiator.

The present invention is based on the observation that a mixture of a vinyl chloride polymer or copolymer and a polymerizable plasticizer can be cured to a rigid or semi-rigid condition, while retaining good colour, by selecting a low curing temperature within a fairly narrow range and a polymerization initiator having a half-life of the same order as the cure time at the temperature chosen, so that after curing is completed a substantial amount of the initiator will remain.

The present invention provides a process for the manufacture of a rigid or semi-rigid shaped material based on a vinyl chloride polymer or copolymer, wherein a composition comprising (1) a vinyl chloride homopolymer or copolymer containing a major proportion of vinyl chloride units, (2) an ethylenically unsaturated compound which will at least swell the vinyl chloride homopolymer or copolymer (1) at an elevated temperature and allow gelation under suitable conditions, and (3) at least 0.2 percent (calculated on the weight of vinyl chloride homopolymer or copolymer) of a free radical polymerization initiator, having a half-life in benzene of 5 to 100 minutes at 135° C., is heated at a temperature within the range of 125 to 155° C. to effect gelation of the vinyl chloride homopolymer or copolymer. With these limitations, the polymerization initiator, temperature of cure and time of cure are so selected that the initiator has a half-life at the chosen temperature approximately equal to the time of cure.

It will be seen that during the whole of the cure and at the end there will always be initiator present yielding an appreciable concentration of free radicals.

Polymerization initiators in general discolour polyvinyl chloride, but in the process of the invention with excess of initiator the decomposing initiator appears to prevent the formation of colour centres near the end of the cure. Since colour normally comes at the end of the cure and as free radical initiators generally cause colour, it is indeed surprising that by carrying out the polymerization so that there will be an appreciable concentration of free radicals in the final stage of the cure discolouration of the polymer can be avoided or reduced.

As the vinyl chloride polymers and copolymers for use in the process of the present invention there come into consideration, more especially, paste grade polyvinyl chloride. Certain grades of polyvinyl chloride and vinyl chloride copolymers can be admixed with liquids to form a paste which can be gelled to give a coherent form. These paste polymers when mixed with non-polymerizable plasticizers give flexible products.

As the ethylenically unsaturated compounds (2), acting as polymerizable plasticizers in the present process, there may be mentioned, for example, styrene, vinyl toluenes (ortho-, meta- and para-isomers or mixtures thereof), dialkyl fumarates and maleates, for example, dinonyl fumarate or maleate, divinyl benzene, allyl esters and higher alkyl methacrylates, for example, nonyl methacrylate. Mixtures of such plasticizers may be used.

The proportion of polymerizable plasticizer should not exceed 50 percent (calculated on the combined weight of vinyl chloride polymer or copolymer and polymerizable plasticizer), and should preferably be more than 10 percent, more especially from 20 to 40 percent.

As examples of free radical polymerization initiators that, as stated above, must have a half-life in benzene at 135° C. of from 5 to 100 minutes there may be mentioned the following (approximate half-life at 135° C. is indicated in brackets): tertiary butyl perbenzoate (20 minutes), tertiary butyl peracetate (12 minutes), dicumyl peroxide (60 minutes), ditertiary butyl diperphthalate (12 minutes), cyclohexanone peroxide (15 minutes) and (tetra-n-propyl)-diphenyl-ethane (10 minutes).

All polymerization initiators falling within the above definition can be used at some temperature in the range 125°–155° C. The initiator and its concentration, and the temperature and time of cure or partial cure are selected accordingly; that is, the initiator must have a half-life approximately equal to the time of cure which can be selected according to other requirements, but is preferably less than 30 minutes and more than 5 minutes. If, for example it is desired to carry out the cure at 145° C. and for a duration of ¼ hour a suitable initiator would be dicumyl peroxide (half-life at 145° C.=20 minutes).

The polymerization initiator is preferably used in a higher proportion than 0.2 percent, advantageously in a proportion of 1 to 2 percent, calculated on the weight of the vinyl chloride polymer or copolymer, as this leads to better colour and clarity in the product. The choice of concentration is governed by the time desired for cure, and the extent of cure required.

Sufficient time must of course be allowed for gelation of the vinyl chloride polymer or copolymer at the temperature selected. If necessary a calculated amount of inhibitor may be added to extend the time available for gelation.

Instead of a single initiator a mixture of two or more initiators may be used in the process of the invention, but in that case rather more latitude is permissible in the selection of the initiator and the definition given above regarding the half-life at 135° C. in benzene, which is applicable to a single initiator, can be extended to include initiators having half-lives between half a minute and 200 minutes at 135° C. Thus a mixture of two initiators, one of which has a half-life time approximately equal to the required time of cure, and the other of which has a much shorter half-life time, may be used. Under these circumstances the concentration of the faster decomposing initiator should not exceed 50% of the total initiator concentration and should preferably be between 5 and 20% of the initiator concentration.

The use of a mixture of initiators of different half-lives has the advantage that the faster decomposing initiator causes rapid initial polymerization and the slower decomposing one persists to the end and is providing free radicals in a significant concentration at the end of the cure.

However, the concentration of the rapidly decomposing initiator should not be so high as to cause polymerization of the polymerizable plasticizer as such a rate that proper gelation of the P.V.C. paste mixture is prevented.

The time available for gelation may be increased by using inhibitor, as in the system containing a single initiator.

As an example of a mixed initiator system that may be used in the present process there may be mentioned (tetra-n-propyl)diphenyl-ethane and tertiary-butyl perbenzoate.

The uncured compositions of the present invention which if desired, may contain additives other than the components (1), (2) and (3) mentioned above, can be formed into, for example, sheet or shaped objects, at the soft stage, that is, in the form of paste or when just gelled. Additives may advantageously be fibrous material and the cured products of the invention are especially useful when reinforced with fibrous materials, for example, glass fibres.

Although products having a good colour can be obtained without the use of a stabiliser for polyvinyl chloride materials, a better colour is obtainable with a stabiliser, especially an organo-tin compound, for example, dibutyl-tin-dimaleate.

The following examples illustrate the invention, the parts and percentages being by weight unless otherwise stated:

EXAMPLE 1

Three polyvinyl chloride compositions in paste form were prepared by mixing the following ingredients in a small mortar:

Composition (A) (for comparison purposes only):

| | Parts |
|---|---|
| Polyvinyl chloride (paste grade, as supplied under trade name "Carina 36") | 100 |
| Dinonyl fumarate | 30 |
| Divinyl benzene | 9 |
| Vinyl toluene | 9 |

Composition (B):

| | Parts |
|---|---|
| Polyvinyl chloride ("Carina 36") | 100 |
| Dinonyl fumarate | 30 |
| Divinyl benzene | 9 |
| Vinyl toluene | 9 |
| Tertiary-butyl perbenzoate | 2 |

Composition (C):

| | Parts |
|---|---|
| Polyvinyl chloride ("Carina 36") | 100 |
| Dinonyl fumarate | 30 |
| Divinyl benzene | 9 |
| Vinyl toluene | 9 |
| Tertiary-butyl perbenzoate | 0.2 |

Each composition was transferred to a screw topped bottle flushed with nitrogen, and allowed to stand overnight to remove air bubbles. It was then spread between two sheets of aluminum, air being excluded as far as possible. The sheets were placed in an air gap between two heavy blocks of brass maintained at 135–140° C. This temperature was rapidly attained by the pastes, which were then heated for various times.

The results shown in Table 1 below were obtained.

*Table 1*

| Composition | Time to produce clear gel (minutes) | Time to attain semi-rigid condition (minutes) | Time to attain rigid condition (minutes) |
|---|---|---|---|
| A | 2 | | |
| B | 1 | 10 | 15 |
| C | <5 | 20 | |

The colour and condition of the products after different curing times is shown in Table 2 below.

*Table 2*

| Composition | Appearance after— | | |
|---|---|---|---|
| | 6 minutes | 10 minutes | 15 minutes |
| A | Practically colourless. | Practically colourless. | Slightly yellow. |
| B | Practically colourless; stiffer than A. | Slightly yellow opaque; Tough, slightly flexible. | Yellowish, slightly pink; Brittle. |
| C | Slightly yellow; stiffer than A. | Brown patches; Slightly flexible. | Brown; Slightly flexible. |

It will be noted from the above tables that the composition B, containing more initiator, gave better coloured products after the same curing times than composition C, even when the products from composition B contained less monomer, that is, were more brittle.

EXAMPLE 2

A polyvinyl chloride composition in paste form was prepared by mixing the following ingredients in a small mortar:

| | Parts |
|---|---|
| Polyvinyl chloride ("Carina 36") | 100 |
| Dinonyl fumarate | 30 |
| Divinyl benzene | 9 |
| Vinyl toluene | 9 |
| Tertiary-butyl-perbenzoate | 1 |
| [Tetra-n-propyl]-diphenyl-ethane | 1 |

The composition was treated and converted into cured sheets by the method described in Example 1. Cured products of good colour, but slightly brownish, were obtained.

EXAMPLE 3

A polyvinyl chloride composition in paste form was prepared by mixing the following ingredients in a small mortar:

| | Parts |
|---|---|
| Polyvinyl chloride ("Carina 36") | 100 |
| Dinonyl fumarate | 10 |
| Polyester resin "RSH 527" | 30 |
| Divinyl benzene | 9 |
| Vinyl toluene | 9 |
| Tertiary-butyl-perbenzoate | 2 |
| Organo-tin stabilizer "Costall 700" | 1 |

The polyester resin "RSH 527" is prepared from 1 mol of sebacic acid, 1 mol of maleic acid and 3 mols of propylene glycol, and is dissolved in 25 percent of vinyl toluene.

"Costall 700" is essentially dibutyl-tin dimaleate.

The above composition was treated as described in Example 1, the sheets being cured for 15 minutes at 135° C. A very clear, pale yellow, hard, brittle product was obtained.

EXAMPLE 4

A polyvinyl chloride composition in paste form was prepared by mixing the following ingredients in a small mortar:

| | Parts |
|---|---|
| Polyvinyl chloride ("Carina 36") | 100 |
| Dinonyl fumarate | 10 |
| Polyester resin "RSH 527" | 30 |
| Styrene | 20 |
| Tertiary-butyl-perbenzoate | 1 |
| Organo-tin stabilizer "Costall 700" | 0.5 |

The above composition was treated as described in Example 1, the sheets being cured for 15 minutes at 135° C. A practically clear, slightly yellow, brittle product was obtained. The colour was not quite so good as that of the product of Example 3.

I claim:
1. A process for the manufacture of an at least semi-rigid shaped material, wherein a composition comprising (1) a paste grade polymer selected from the group consisting of vinyl chloride homopolymers and copolymers of vinyl chloride with a minor proportion of a monomer selected from group consisting of vinyl acetate and vinylidene chloride, (2) as a polymerizable plasticizer at least one ethylenically unsaturated monomer which has a boiling point exceeding 125° C. and which allows gelation of the polymer (1) by heating at a temperature within the range of 125° C. to 155° C. for a period decreasing from 10 minutes at 125° C. to 2 minutes at 155° C., the proportion of the polymerizable plasticizer (2) not exceeding 50% of the total weight of (1) and (2), and (3) at least 0.2% and not more than 2%, calculated on the weight of polymer (1), of a free radical polymerization initiator having a half-life time in benzene of 5 to 100 minutes at 135° C., is heated at a temperature within the range of 125° C. to 155° C. to effect gelation of the polymer (1), the polymerization, initiator, temperature and time of cure being so chosen that the time of cure does not exceed two half-lives of the initiator at the selected temperature so that at the end of the cure the initiator persists and is providing free radicals at a rate not less than 25% of the initial rate of production of free radicals by the initiator.

2. A process for the manufacture of an at least semi-rigid shaped material, wherein a composition comprising (1) a paste grade polyvinyl chloride, (2) as a polymerizable plasticizer at least one ethylenically unsaturated compound having a boiling point exceeding 125° C. and which allows gelatin of the polymer (1) by heating at a temperature within the range of 125° C. to 155° C. for a period decreasing from 10 minutes at 125° C. to 2 minutes at 155° C., the proportion of polymerizable plasticizer (2) not exceeding 50% of the total weight of (1) and (2), and (3) at least 0.2% and not more than 2%, calculated on the weight of the polymer (1), of a free radical polymerization initiator having a half-life time in benzene of 5 to 100 minutes at 135° C., is heated at a temperature within the range of 125° C. to 155° C. to effect gelation of the polymer (1), the polymerization initiator, temperature and time of cure being so chosen that the initiator has a half-life time at the chosen temperature that is at least approximately equal to the time of cure.

3. A process for the manufacture of an at least semi-rigid shaped material, wherein a composition comprising (1) a paste grade polyvinyl chloride, (2) as a polymerizable plasticizer at least one ethylenically unsaturated compound having a boiling point exceeding 125° C. and which allows gelation of the polymer (1) by heating at a temperature within the range of 125° C. to 155° C. for a period decreasing from 10 minutes at 125° C. to 2 minutes at 155° C., in a proportion not exceeding 50% of the total weight of (1) and (2), and (3) a proportion within the range of 1 to 2%, calculated on the weight of polymer (1) of a free radical polymerization initiator selected from the group consisting of tertiary-butyl-perbenzoate, tertiary-butyl-peracetate, dicumyl peroxide, ditertiary-butyl-diperphthalate, cyclohexanone peroxide and (tetra-n-propyl)-diphenyl-ethane, is heated at a temperature within the range of 125° C. to 155° C. to effect gelation of the polymer (1), the polymerization initiator, temperature and time of cure being so chosen that at the chosen temperature the initiator has a half-life time that is at least approximately equal to the time of cure.

4. A process for the manufacture of an at least semi-rigid shaped material, wherein a composition comprising (1) a paste grade polyvinyl chloride, (2) as a polymerizable plasticizer at least one compound selected from the group consisting of styrene, ortho-, meta- and para-methylstyrene, dialkyl fumarate, dialkyl maleate, allyl esters of sebacic acid, higher alkyl methacrylates, divinyl benzene and mixtures comprising at least two of such monomers, the proportion of the polymerizable plasticizer (2) lying within the range of 20 to 40% of the total weight of (1) and (2), and (3) at least 0.2% and not more than 2%, calculated on the weight of polymer (1) of a free radical polymerization initiator having a half-life time in benzene of 5 to 100 minutes at 135° C., is heated at a temperature within the range of 125° C. to 155° C. to effect gelation of the polymer (1), the polymerization initiator, temperature and time of cure being so chosen that, at the chosen temperature, the initiator has a half-life time that is at least approximately equal to the time of cure.

5. A process for the manufacture of an at least semi-rigid shaped material, wherein a composition comprising (1) a paste grade polyvinyl chloride, (2) as a polymerizable plasticizer dinonyl fumarate, the proportion of the polymerizable plasticizer (2) lying within the range of 20 to 40% of the total weight of (1) and (2), and (3) at least 0.2% and not more than 2%, calculated on the weight of polymer (1) of a free radical polymerization initiator having a half-life time in benzene of 5 to 100 minutes at 135° C., is heated at a temperature within the range of 125° C. to 155° C. to effect gelation of the polymer (1), the polymerization initiator, temperature and time of cure being so chosen that, at the chosen temperature, the initiator has a half life time that is at least approximately equal to the time of cure.

6. A process for the manufacture of an at least semi-rigid shaped material, wherein a composition comprising (1) a paste grade polyvinyl chloride, (2) as a polymerizable plasticizer at least one ethylenically unsaturated monomer which has a boiling point exceeding 125° C. and which allow gelation of the polymer (1) by heating at a temperature within the range of 125° C. to 155° C. for a period decreasing from 10 minutes at 125° C. to 2 minutes at 155° C., the proportion of the polymerizable plasticizer (2) not exceeding 50% of the total weight of (1) and (2), and (3) at least 0.2% and not more than 2%, calculated on the weight of polymer (1), of a free radical polymerization initiator having a half-life time in benzene of 5 to 100 minutes at 135° C., is heated at a temperature within the range of 125° C. to 155° C. to effect gelation of the polymer (1), the polymerization initiator, temperature and time of cure being so chosen that the time of cure does not exceed two half-lives of the initiator at the selected temperature so that at the end of the cure the initiator persists and is providing free radicals at a rate not less than 25% of the initial rate of production of free radicals by the initiator.

7. A process for the manufacture of an at least semi-rigid shaped material, wherein a composition comprising (1) a paste grade polymer selected from the group consisting of vinyl chloride homopolymers and copolymers of vinyl chloride with a minor proportion of a monomer selected from group consisting of vinyl acetate and vinylidene chloride, (2) as a polymerizable plasticizer at least one ethylenically unsaturated monomer which has a boiling point exceeding 125° C. and which allow gelation of the polymer (1) by heating at a temperature within the range of 125° C. to 155° C. for a period decreasing from 10 minutes at 125° C. to 2 minutes at 155° C., the proportion of the polymerizable plasticizer (2) not exceeding 50% of the total weight of (1) and (2), and (3) at least 0.2% and not more than 2%, calculated on the weight of the polymer (1), of a mixture comprising at least two free radical polymerization initiators having different half-life times, each initiator having a half-life time in benzene at 135° CC. of 0.5 to 200 minutes, is heated at a temperature within the range of 125° C. to 155° C. to effect gelation of the polymer (1), the choice of initiators and conditions of cure being such that at the end of the cure at least 25% of the slower decomposing initiator persists.

8. A process for the manufacture of an at least semi-rigid shape material, wherein a composition comprising (1) a paste grade polyvinyl chloride, (2) as a polymerizable plasticizer at least one ethylenically unsaturated monomer which has a boiling point exceeding 125° C. and which allow gelation of the polymer (1) by heating at a temperature within the range of 125° C. to 155° C. for a period decreasing from 10 minutes at 125° C. to 2 minutes at 155° C., the proportion of the polymerizable plasticizer (2) not exceeding 50% of the total weight of (1) and (2), and (3) at least 0.2% and not more than 2%, calculated on the weight of the polymer (1), of a mixture comprising two free radical polymerization initiators, the one having a half-life time approximately equal to the time of cure and the other having a shorter half-life time, the concentration of the faster decomposing initiator not exceeding 50% by weight of the total initiator mixture, is heated at a temperature within the range of 125° C. to 155° C. to effect gelation of the polymer (1), the choice of initiators and conditions of cure being such that at the end of the cure at least 25% of the slower decomposing initiator persists.

9. A process for the manufacture of an at least semi-rigid shaped material wherein a composition comprising (1) a paste grade polymer selected from the group consisting of vinyl chloride homopolymers and copolymers of vinyl chloride with a minor proportion of a monomer selected from vinyl acetate and vinylidene chloride, (2) as a polymerizable plasticizer at least one ethylenically unsaturated monomer which has a boiling point exceeding 125° C. and which allow gelation of the polymer (1) by heating at a temperature within the range of 125° C. to 155° C. for a period decreasing from 10 minutes at 125° C. to 2 minutes at 155° C., the proportion of the polymerizable plasticizer (2) not exceeding 50% of the total weight of (1) and (2), and (3) at least 0.2% and not more than 2%, calculated on the weight of the polymer (1), of a mixture comprising two free radical polymerization initiators the one being a half-life time approximately equal to the time of cure and the other having a shorter half-life time, the concentration of the faster decomposing initiator being within the range of 5 to 20% by weight of the total initiator mixture, is heated at a temperature within the range of 125° CC. to 155° C. to effect gelation of the polymer (1), the choice of initiators and conditions of cure being such that at the end of the cure at least 25% of the slower decomposing initiator persists.

10. A process for the manufacture of an at least semi-rigid shaped material, wherein a composition comprising (1) a paste grade polymer selected from the group consisting of vinyl chloride homopolymers and copolymers of vinyl chloride with a minor proportion of a monomer selected from vinyl acetate and vinylidene chloride, (2) as a polymerizable plasticizer at least one ethylenically unsaturated monomer which has a boiling point exceeding 125° C. and which allow gelation of the polymer (1) by heating at a temperature within the range of 125° C. to 155° C. for a period decreasing from 10 minutes at 125° C. to 2 minutes at 155° C., the proportion of the polymerizable plasticizer (2) not exceeding 50% of the total weight of (1) and (2) and (3) at least 0.2% and not more than 2%, by weight calculated on the polymer (1), of a mixture of (tetra-n-propyl)-diphenyl-ethane and tertiary-butyl perbenzoate, the concentration of (tetra-n-propyl)-diphenyl-ethane not exceeding 50% by weight of the total mixture, is heated at a temperature within the range of 125° C. to 155° C. to effect gelation of the polymer (1), the conditions of cure being such that at the end of the cure at least 25% of the tertiary-butyl perbenzoate persists.

11. A process for the manufacture of an at least semi-rigid shaped material, wherein a composition comprising (1) a paste grade polyvinyl chloride, (2) as a polymerizable plasticizer dinonyl maleate, the proportion of the polymerizable plasticizer (2) lying within the range of 20 to 40% of the total weight of (1) and (2), and (3) at least 0.2% and not more than 2%, calculated on the weight of polymer (1) of a free radical polymerization initiator having a half-life time in benzene of 5 to 100 minutes at 135° C., is heated at a temperature within the range of 125° C. to 155° C. to effect gelation of the polymer (1), the polymerization initiator, temperature and time of cure being so chosen that, at the chosen temperature, the initiator has a half life time that is at least approximately equal to the time of cure.

12. A process for the manufacture of an at least semi-rigid shaped material, wherein a composition comprising (1) a paste grade polyvinyl chloride, (2) as a polymerizable plasticizer a mixture of dinonyl fumarate and dinonyl maleate, the proportion of the polymerizable plasticizer (2) lying within the range of 20 to 40% of the total weight of (1) and (2), and (3) at least 0.2% and not more than 2%, calculated on the weight of polymer (1) of a free radical polymerization initiator having a half-life time in benzene of 5 to 100 minutes at 135° C., is heated at a temperature within the range of 125° C. to 155° C. to effect gelation of the polymer (1), the polymerization initiator, temperature and time of cure being so chosen that, at the chosen temperature, the initiator has a half life time that is at least approximately equal to the time of cure.

References Cited in the file of this patent
FOREIGN PATENTS

| | | |
|---|---|---|
| 691,908 | Great Britain | May 27, 1953 |
| 694,408 | Great Britain | July 22, 1953 |